US012352403B2

(12) United States Patent
Gatsios et al.

(10) Patent No.: US 12,352,403 B2
(45) Date of Patent: Jul. 8, 2025

(54) HEADLIGHTS FOR VEHICLES AND ADJUSTMENT PROCEDURES

(71) Applicant: Hella GmbH & Co. KGaA, Lippstadt (DE)

(72) Inventors: Sebastian Gatsios, Arnsberg (DE); Florian Herold, Bielefeld (DE); Dirk Kliebisch, Paderborn (DE); Ingo Möllers, Rietberg (DE); Alexander Schwan, Kamen (DE); Patrick Vogel, Unna (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/617,509

(22) Filed: Mar. 26, 2024

(65) Prior Publication Data

US 2024/0337362 A1 Oct. 10, 2024

(30) Foreign Application Priority Data

Apr. 6, 2023 (DE) ........................ 102023108900.5

(51) Int. Cl.
*F21S 41/657* (2018.01)
*F21S 41/153* (2018.01)

(52) U.S. Cl.
CPC ........... *F21S 41/657* (2018.01); *F21S 41/153* (2018.01)

(58) Field of Classification Search
CPC .............................. F21S 41/357; F21S 41/153
USPC .......................................................... 362/467
See application file for complete search history.

(56) References Cited

U.S. PATENT DOCUMENTS

| | | | | | |
|---|---|---|---|---|---|
| 6,953,274 | B2 | 10/2005 | Rice | | |
| 7,226,185 | B2 * | 6/2007 | Dolgin | G02B 3/00 | 362/455 |
| 7,501,767 | B2 * | 3/2009 | Hayami | B60Q 1/12 | 315/77 |
| 7,731,402 | B2 * | 6/2010 | Tessnow | F21S 41/153 | 362/555 |
| 7,862,217 | B2 * | 1/2011 | Suzuki | F21S 41/155 | 362/545 |
| 8,314,558 | B2 * | 11/2012 | Dassanayake | F21S 41/663 | 315/82 |
| 8,517,578 | B2 * | 8/2013 | Shiao | F21S 41/663 | 362/512 |

(Continued)

FOREIGN PATENT DOCUMENTS

| | | | |
|---|---|---|---|
| DE | 602004010004 | T3 | 10/2013 |
| DE | 102016120222 | A1 | 4/2018 |

*Primary Examiner* — Bryon T Gyllstrom
(74) *Attorney, Agent, or Firm* — Husch Blackwell LLP

(57) ABSTRACT

A headlamp for vehicles is provided that has an LED light source containing numerous light pixels. The headlamp also includes an optics unit in front of the light source in the main beam direction (H) with which the light pixels are mapped onto a predefined light distribution (LV1, LV2, LV2', LV2"). The headlamp also includes a sensor unit for determining at least one vehicle state variable, an adjustment unit for adjusting a part of the headlamp, and a control unit for controlling the light pixels and the adjustment unit. The LED adjustment unit moves the light source in a linear direction transverse to an optical axis (A) of the optics unit, and/or pivoted about the optical axis (A) of the optics unit, from a starting position to an intermediate position and back, on the basis of a change in the vehicle state variable.

11 Claims, 3 Drawing Sheets

(56) References Cited

U.S. PATENT DOCUMENTS

| | | | | |
|---|---|---|---|---|
| 11,619,373 | B2 * | 4/2023 | Halliwell | F21V 17/02 362/235 |
| 11,788,701 | B2 * | 10/2023 | Colombel | F21S 41/27 362/509 |
| 2007/0041207 | A1 * | 2/2007 | Ishida | F21S 41/155 362/538 |
| 2013/0215635 | A1 * | 8/2013 | Boyd, Jr. | F21S 41/657 362/519 |
| 2013/0242100 | A1 * | 9/2013 | Seki | F21S 41/663 348/148 |
| 2014/0029279 | A1 * | 1/2014 | Suckling | F21S 41/153 362/510 |
| 2014/0175978 | A1 * | 6/2014 | Kobayashi | F21S 41/635 362/487 |
| 2014/0321135 | A1 | 10/2014 | Chen et al. | |

* cited by examiner

HEADLIGHTS FOR VEHICLES AND ADJUSTMENT PROCEDURES

CROSS REFERENCE

This application claims priority to German Application No. 10 2023 108900.5, filed Apr. 6, 2023, the entirety of which is hereby incorporated by reference.

FIELD OF THE INVENTION

The invention also relates to a method for adjusting a light distribution for a moving vehicle to different driving situations, in which a part of the headlamp is moved mechanically on the basis of sensor data characterizing the driving state of the vehicle to alter the light distribution.

BACKGROUND OF THE INVENTION

A high resolution headlamp for vehicles is disclosed in DE 10 2016 120 222 A1 that has a light source composed of numerous light pixels and an optics unit with which a predefined light distribution is obtained. There is an adjustment unit with which the range of the headlamp is set on the basis of the current operating state of the vehicle, which adjusts the entire headlamp, or a phosphor converter, or a projection lens. This allows for larger adjustments than can be obtained with a change in the light distribution by controlling different light pixels in the light source. The vehicle state is determined by a sensor unit with which inclination angles, e.g. the pitch angle and steering angle, are detected by sensors. Adjusting the light distribution to the extent of change in the vehicle state is obtained for small adjustments by controlling separate light pixels, and for large adjustments by controlling the adjustment unit that changes the position of the entire headlamp.

BRIEF SUMMARY OF THE INVENTION

The object of the present invention is therefore to create a headlamp for vehicles and an adjustment method, such that a predefined light distribution can be substantially maintained, independently of a change in the vehicle state variables, in a simple and effective manner.

This problem is solved by the invention, characterized in that there is an LED adjustment unit with which the light source can be moved in a linear direction transverse to an optical axis of the optics unit and/or pivoted about the optical axis of the optics unit from a starting position to an intermediate position and back, on the basis of a change in the vehicle state variable.

The invention makes use of an LED adjustment unit with which just one LED light source is moved linearly and/or pivoted about an optical axis of an optics unit in the headlamp. The invention advantageously makes it possible for a single adjustment unit to compensate for small and large changes in the vehicle state variable. By way of example, the light distribution can be adjusted in the case of a basically stationary change in inclination of the vehicle resulting from the loading thereof, and in the case of a highly dynamic change in inclination on the part of the vehicle when accelerating and/or braking. The fundamental concept of the invention is to adjust that part of the headlamp with which a relatively large change in the position of the light distribution can be obtained with small changes. By adjusting the LED light source by micrometers, relatively large vehicle state changes can be compensated for. With relatively small changes in the vehicle state variables, e.g. the inclination thereof, the light source is moved by the precision adjustment unit functioning at a high resolution.

According to a preferred embodiment of the invention, the adjustment unit is a precision adjustment unit, which is designed to move the LED light source precisely within the micrometer range. This allows for adjustments in the position of the light distribution in the case of relatively small changes in the vehicle state variables.

According to one development of the invention, the control unit contains an adjustment control for generating a control signal that acts on the adjustment unit, which is generated on the basis of a comparison of the vehicle state variable detected by the sensor unit with a predefined threshold value. An activation of the adjustment unit and therefore the movement of the LED light source first takes place when the vehicle state variable exceeds the predefined threshold value. The threshold value basically forms a trigger value that determines when a compensation for the altered vehicle state situation is supposed to take place in the light distribution. A sequence of threshold values, e.g. at equal spacings, can be obtained with an adjustment control program, such that the LED light source is moved in increments as each higher threshold value is reached. The threshold value sequence therefore allows for a discrete adjustment of the LED light source in a specific direction and in the opposite direction.

According to one development of the invention, the adjustment control is configured to generate a curve control signal on the basis of the vehicle state variable relating to a steering angle, with which the LED light source is caused to move linearly in a horizontal direction. By this means, an adjustment of the light distribution position can be obtained when the vehicle travels through a curve.

According to one development of the invention, the adjustment control is configured to generate a pitch angle control signal on the basis of the vehicle state variable relating to the pitch angle, which causes the LED light source to be moved linearly in a vertical direction. Advantageously, when the vehicle travels over a hill or a dip, or when the vehicle is being loaded, the position of the light distribution can be adjusted accordingly.

According to one development of the invention, the control unit contains a light pixel control for generating a control signal for the individual light pixels, which is configured to increase the brightness of the light pixels that are further from the optical axis of the optics unit when the light source has been adjusted. This brightening of the light pixels compensates for a distortion in the light distribution caused by the light pixels at a further distance to the optical axis. The undesired distortion in the light distribution can therefore be minimized.

The particular advantage of the adjustment method according to the invention is that light distributions can be altered with just one component, specifically an LED light source, such that changes in a vehicle state variable can be compensated for to a large extent. Vehicle state variables are understood to be parameters relating to the position of the vehicle in relation to the road, e.g. pitches or tilts. Vehicle state variables also include those variables relating to the state of the vehicle in relation to the environment, or the road. By way of example, a sensor unit can detect when a vehicle travels over a hill or a dip in the road, resulting in an undesired raising or lowering of the light distribution in relation to the road. By altering the position of the LED light source, the headlamp range can be adjusted to these situations.

According to one development of the invention, light pixels that are further from the optical axis are also made brighter with the mechanical adjustment of the light source. Distortions on the edge of the light distribution can be compensated for by this means. Darker regions of the light distribution can be made brighter with these light pixels. This results in a more homogenous light distribution at the edges.

According to one development of the invention, control signals for mechanically adjusting the LED light source are generated by sequential comparisons of threshold values in a sequence of threshold values. The threshold value sequence preferably contains threshold values at equal spacings, which are so small that the changes in the position of the light distribution are smooth and homogenous.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
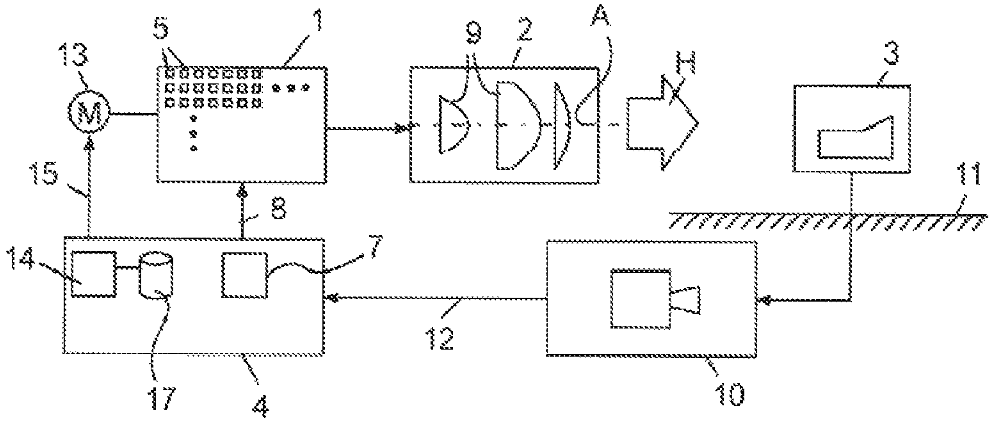
FIG. 1 shows a schematic illustration of a headlamp according to the invention.

A headlamp for vehicles F is substantially composed of a light source 1, an optics unit 2 for mapping the light source 1 onto a light distribution 3, and a control unit 4.

The light source 1 is an LED light source, containing numerous light pixels 5 arranged in a matrix. By way of example, 16,000 light pixels 5 can be placed on a printed circuit board 6.

The control unit 4 contains a light pixel control 7 for generating a control signal 8 with which the light pixels 5 can be controlled individually. Specific light pixels 5 are switched on or off therewith, on the basis of a predefined light distribution 3.

The optics unit 2 contains a number of lenses 9 with which the light pixels are projected into the area 11 in front of the vehicle, such that the light distribution 3 is obtained. This is a high-resolution headlamp, also referred to as a matrix headlamp. The light distribution 3 can be a non-blinding high beam in which regions are dimmed by deactivating specific light pixels 5 in which other road users such as pedestrians or oncoming vehicles are present. The headlamp has a sensor unit 10 for this, containing a camera, for example, for detecting objects in the area 11 in front of the vehicle. The sensor unit 10 can contain other sensors. By way of example, the sensor unit 10 can contain a pitch angle sensor with which the pitch angle of a vehicle F about the lateral axis of the vehicle can be detected. This can be used to detect when the vehicle is being loaded or unloaded. The sensor unit can also contain a tilt angle sensor that detects an inclination of the vehicle F over its longitudinal axis. The tilt angle of the vehicle F when travelling through a curve can be detected by this means. The sensor unit can also contain a steering angle sensor that determines the degree to which the wheels are turned in the vehicle F. The sensors generate signals 12 that the sensor unit 10 sends to the control unit 4.

The headlamp also contains an adjustment unit 13 with which the LED light source 1 can be moved mechanically. This adjustment unit 13 can contain adjustment means with which the LED light source 1 can be moved linearly in directions at a right angle to one another. The linear movement is perpendicular to an optical axis A of the optics unit 2. If the vehicle F moves along the x-axis, the adjustment unit 13 is configured to move the LED light source 1 along the y-axis (transverse to the vehicle) and the z-axis (vertically).

The adjustment unit 13 also contains means for pivoting the light source 1 about the optical axis A of the optics unit 2 over an angle q.

The control unit 4 contains an adjustment control 14 for controlling the adjustment unit 13. The control of the light source 1 shall be explained below in reference to different vehicle state variables, or driving situations.

An adjustment of the light distribution 3 can take place over a horizontal angle $\alpha$ when the vehicle F travels through a curve. When travelling through a curve, the position of the light distribution 3 only follows the position of the area 11 in front of the vehicle, or the road lane, in a delayed manner, such that it is desirable to move the light distribution 3 from a first position to a second position when making a right turn, specifically from a starting position when traveling in a straight line, as indicated by the broken line in FIG. 1, to a turned position indicated by the solid line in FIG. 1. For this, the adjustment unit 13 is moved to the left over a distance $\Delta s$ horizontally (y-axis) along a linear path that is transverse to the optical axis A, in the present example, by a control signal 15 (horizontal movement control signal) that is generated in the adjustment control 14, in order to move the light distribution 3 to the right in the desired manner. The light beam illustrated in FIG. 2 results in a light distribution LV1 in the starting position, and a light distribution LV2 in an intermediate position. The second light distribution LV2 is moved to the right of the first light distribution LV1 in the drawing.

According to a preferred embodiment of the invention, the light pixel control 7 generates a control signal 8 with which light pixels 5' further from the optical axis A are made brighter than the other light pixels 5, preventing any distortions in the second light distribution LV2. This portion is made brighter, such that the second light distribution LV2 does not have any dark areas, and a homogenous distribution is also obtained in the intermediate position.

Figure 3:
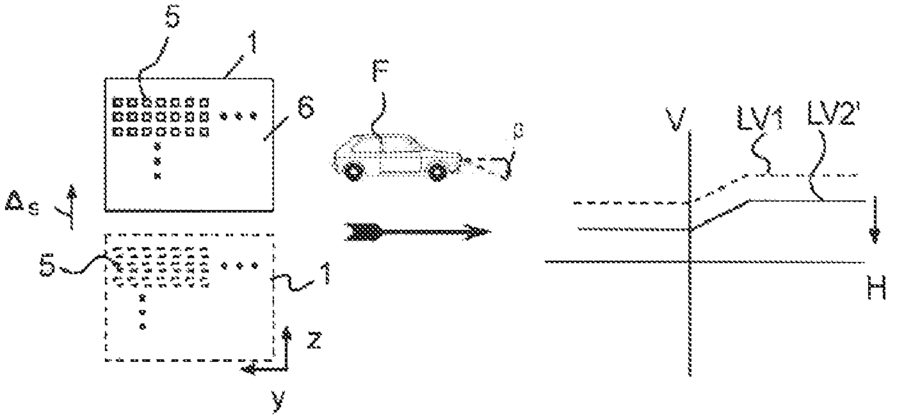
FIG. 3 shows an illustration of the change in position of an LED light source and a light distribution when the vehicle experiences a change in pitch.

According to another variation of the invention shown in FIG. 3, the adjustment control 14 generates a pitch angle control signal 15 with which the light distribution LV1 is moved while the vehicle F while the vehicle is traveling in a straight line, to a second light distribution LV2' when it passes over a hill. When the vehicle reaches the crest of the hill, the range of the light distribution LV1 becomes too great. To prevent this, the LED light source 1 is moved vertically upward from the starting position by the adjustment unit 13 over a distance of $\Delta s$ along the z-axis, such that the light distribution LV1 is lowered by the pitch angle $\beta$ to the light distribution LV2'. The light distribution LV2' therefore has the same shape in the intermediate position as the first light distribution LV1 when the vehicle is traveling in a straight line. The sensor unit detects the altered environmental conditions by evaluating the image data relating to the area 11 in front of the vehicle obtained from the camera.

This data is evaluated in the control unit 4 and the control signal 14 for the linear movement of the light source 1 over the distance Δs is generated therefrom.

A vertical movement control signal 15 can also be generated with the pitch angle sensor when the vehicle is being loaded, such that the position of the vehicle F in relation to the area 11 in front of the vehicle changes.

Figure 4:
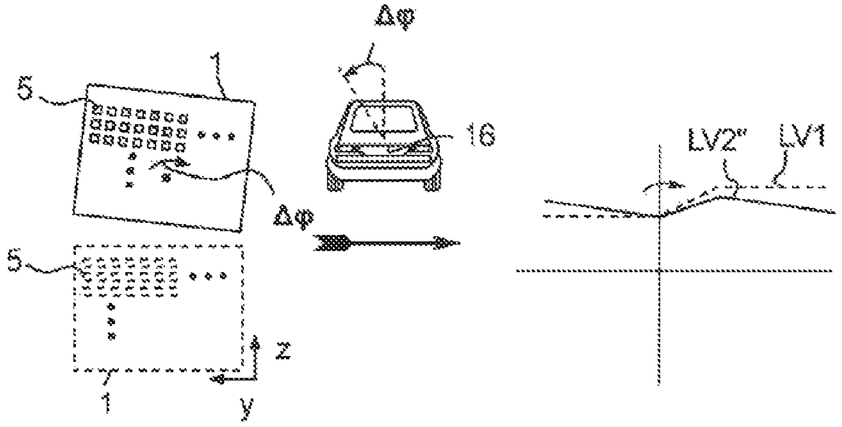
FIG. 4 shows an illustration of the change in position of an LED light source and a light distribution when the vehicle tilts.

According to another embodiment of the invention shown in FIG. 4, the inclination of the vehicle F over its longitudinal axis 16 can be detected by a tilt angle sensor. On the basis of this vehicle state variable, a tilt angle control signal 15 is generated with which the light source 1 is pivoted about the optical axis A over the angle Δφ. If the vehicle F travels through a sharp right-hand curve, as may be the case on a highway, the vehicle tilts toward the left, such that the light distribution LV1 pivots toward the left about the tilt angle Δφ. To compensate for this, the light source 1 is pivoted toward the right over Δφ in the direction of travel, such that a second light distribution LV2" assumes the position of the light distribution LV1 when travelling in a straight line, without tilting.

Figure 5:
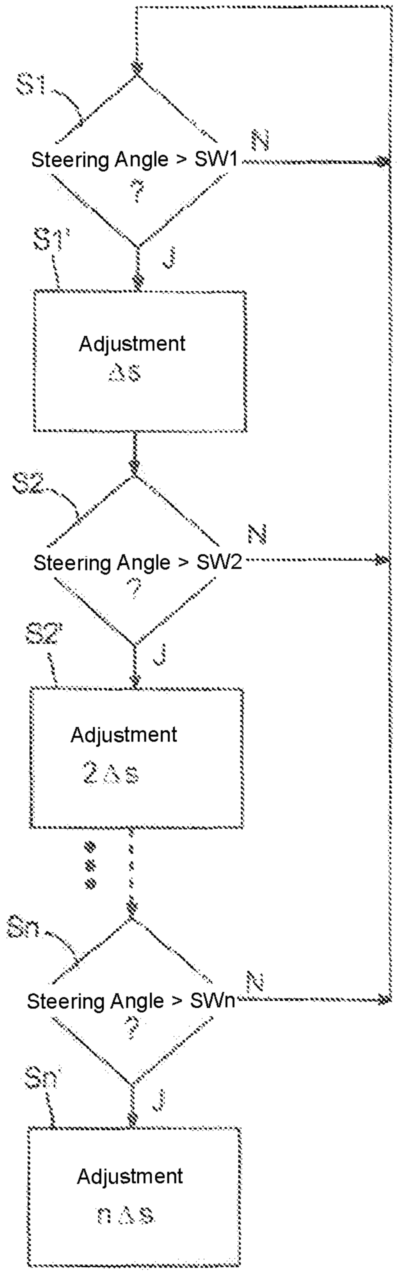
FIG. 5 shows a flow chart for adjustment control.

The sequence of the adjustment unit control 14 in the control unit 4 is shown in greater detail in FIG. 5. It is assumed that in the initial state of the vehicle F, it is travelling in a straight line, in which the light distribution LV1 is generated. A continuous comparison of the sensor signals from the sensor unit 10 with predefined threshold values SW1, SW2, SWn stored in the control unit 4 takes place. The sequence shown here can be contained in a control program stored in a memory 17 in the control unit 4. By way of example, a right-hand turn, such as that shown in FIG. 2 shall be examined. If it is determined in step S1 that the vehicle state variable, specifically the steering angle α, is greater than a first threshold value SW1, a control signal 15 is generated with which the light source 1 is moved horizontally over the distance Δs. This takes place in step S1'.

Figure 2:
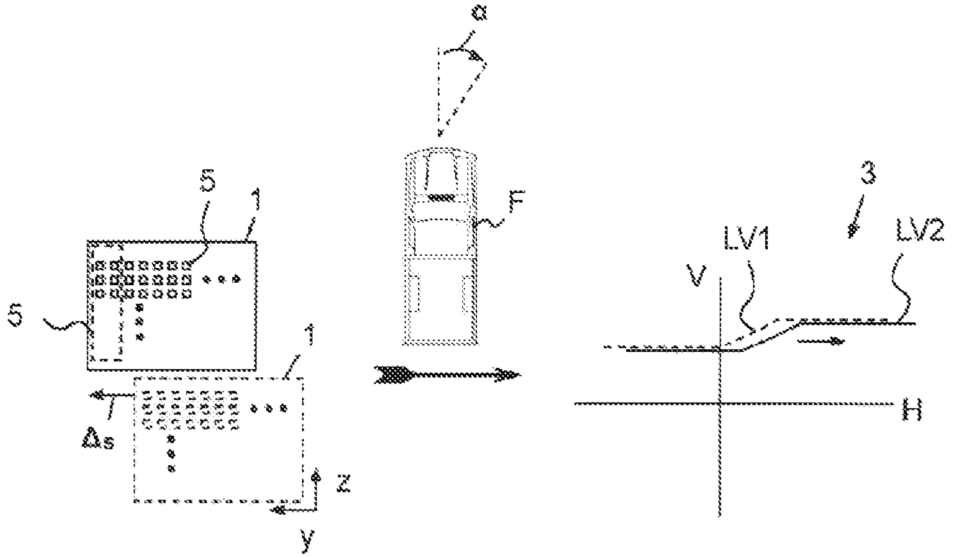
FIG. 2 shows an illustration of the change in position of an LED light source and a light distribution when travelling through a curve.

In a second step S2, the current steering angle α is compared with a second threshold value SW2, which is greater than the first threshold value SW1 by the amount Δs. If this threshold value SW2 is exceeded, another control signal 15 is generated in the control unit 14, with which the light source 1 is moved an additional distance Δs. The increase in the current steering angle α is then checked in further steps Sn, Sn', in which further threshold values SWn are provided, at the same increments to one another. The light distribution LV2 is moved discretely in this manner, until it reaches the position at the maximum distance to the initial light distribution LV1, as shown in FIG. 2. As the steering angle α decreases, the light source 1, or the light distribution LV2 is moved discretely back until reaching the starting position.

The movement of the light source in a linear direction preferably takes place in the range of micrometers. The adjustment unit 13 has a piezoelectric actuator for this, which can move and pivot the light source 1 precisely within the micrometer range.

The detected sensor data relating to pitch angle, steering angle, etc. are regarded as the vehicle state variables. Evaluations by a detection unit, in particular a camera for determining environmental conditions, or road conditions, are also regarded as vehicle state variables.

LIST OF REFERENCE SYMBOLS

1 LED light source
2 optics unit
3 light distribution
4 control unit
5, 5' light pixel
6 printed circuit board
7 light pixel control
8 control signal
9 lens
10 sensor unit
11 area in front of the vehicle
12 sensor signal
13 adjustment unit
14 adjustment unit control
15 control signal
16 vehicle longitudinal axis
17 memory
F vehicle
A optical axis
Δs distance
φ angle
LV1, LV2, LV2', LV2" light distribution
Δφ angle
S1, S1', S2, S2', Sn, Sn' steps
SW1, SW2, SWn threshold values
α steering angle
β pitch angle
Δa amount
H main beam direction

We claim:

1. A headlamp for vehicles, the headlamp comprising:
an LED light source comprising numerous light pixels,
an optics unit in front of the LED light source in a main beam direction (H) with which the light pixels are mapped onto a light distribution (LV1, LV2, LV2', LV2"),
a sensor unit for determining at least one vehicle state variable,
an adjustment unit for adjusting a part of the headlamp, and
a control unit for controlling the light pixels and the adjustment unit,
wherein the adjustment unit moves the LED light source in a linear direction transverse to an optical axis (A) of the optics unit, and/or pivoted about the optical axis (A) of the optics unit, between a starting position to an intermediate position, on the basis of a change in the vehicle state variable, and
wherein the control unit comprises a light pixel control that generates a control signal for controlling a brightness of the light pixels individually when the LED light source is moved.

2. The headlamp according to claim 1, wherein the control unit generates a horizontal movement control signal on the basis of a steering angle sensor signal and/or a lane detection unit signal from the sensor unit, wherein the adjustment unit causes the LED light source to move linearly in a horizontal direction (Y) in response to the horizontal movement control signal.

3. The headlamp according to claim 1, wherein the control unit generates a vertical movement control signal on the basis of a pitch angle sensor signal from the sensor unit, wherein the adjustment unit causes the LED light source to move linearly in a vertical direction (Δs) in response to the vertical movement control signal.

4. The headlamp according to claim 1, wherein the control unit generates a tilt angle control signal on the basis of a tilt angle sensor signal from the sensor unit that characterizes a lateral tilting of a vehicle (F), wherein the adjustment unit causes the LED light source to pivot (Δφ) about the optical axis (A) of the optics unit in response to the tilt angle control signal.

5. The headlamp according to claim 1, wherein the light pixels of the LED light source are arranged in a matrix on a printed circuit board.

6. The headlamp according to claim 1, wherein the light pixel control is configured such that light pixels that are farthest away from the optical axis (A) of the optics unit when the LED light source is moved are made brighter.

7. The headlamp according to claim 1, wherein the adjustment unit comprises a piezoelectric actuator.

8. A method for adjusting a light distribution (LV1) for a moving vehicle (F) to different situations, the method comprising the steps of:

mechanically moving a part of a headlamp on the basis of sensor data characterizing a driving state of the vehicle (F), thereby altering the light distribution (LV1), wherein an LED light source is moved in a linear direction transverse to an optical axis (A) of an optics unit, and/or pivoted about the optical axis (A), wherein a brightness of light pixels of the LED light source is individually controlled when the LED light source is moved and the light distribution (LV1) is altered to compensate for distortion in the altered light distribution.

9. The method according to claim 8, wherein the LED light source is moved in sequential adjustment increments of micrometers from a starting position, in which the light distribution (LV1) is in a first operating position, to an intermediate position, in which the light distribution is in a second operating position.

10. The method according to claim 8, wherein light pixels that are farther away from the optical axis (A) of the optics unit than other light pixels when the light distribution (LV1) is altered are made brighter.

11. The method according to claim 8, wherein vehicle state variables obtained from the sensor data are sequentially compared with a series of threshold values (SW1, SW2, SWn), wherein adjacent threshold values (SW1, SW1, SWn) are spaced apart equally.

* * * * *